(12) United States Patent
Draluk et al.

(10) Patent No.: US 7,242,929 B2
(45) Date of Patent: Jul. 10, 2007

(54) METHOD AND APPARATUS FOR DYNAMIC EXTENSION OF DEVICE MANAGEMENT TREE DATA MODEL ON A MOBILE

(75) Inventors: Vadim Draluk, Cupertino, CA (US); John D. Bruner, Barrington, IL (US); Boris Klots, Belmont, CA (US); Denis A. Petushkov, Sunnyvale, CA (US); Harish Prabandham, San Jose, CA (US)

(73) Assignee: Motorola Inc., Schaumburg, IL (US)

( * ) Notice: Subject to any disclaimer, the term of this patent is extended or adjusted under 35 U.S.C. 154(b) by 18 days.

(21) Appl. No.: 11/086,496

(22) Filed: Mar. 22, 2005

(65) Prior Publication Data

US 2005/0282533 A1 Dec. 22, 2005

Related U.S. Application Data

(60) Provisional application No. 60/555,269, filed on Mar. 22, 2004.

(51) Int. Cl.
*H04M 3/00* (2006.01)
*H04M 1/00* (2006.01)
*H04Q 7/20* (2006.01)
*H04B 1/38* (2006.01)

(52) U.S. Cl. ............ 455/419; 455/418; 455/420; 455/425; 455/550.1; 455/557

(58) Field of Classification Search .. 455/556.1–556.2, 455/550.1, 552.1, 554.2, 557–559, 517, 423–425, 455/422.1, 414.1, 418–420, 560–561, 553.1, 455/66.1, 451, 566, 466; 709/203, 217–228, 709/230; 370/328, 349, 338; 717/100–221; 715/740–751

See application file for complete search history.

(56) References Cited

U.S. PATENT DOCUMENTS

| | | | |
|---|---|---|---|
| 6,643,506 B1* | 11/2003 | Criss et al. | 455/419 |
| 6,970,697 B2* | 11/2005 | Kouznetsov et al. | 455/418 |
| 2003/0103484 A1* | 6/2003 | Oommen et al. | 370/338 |
| 2003/0204640 A1* | 10/2003 | Sahinoja et al. | 709/311 |
| 2004/0093592 A1* | 5/2004 | Rao | 717/168 |
| 2004/0158583 A1* | 8/2004 | Kaappa | 707/104.1 |
| 2004/0171382 A1* | 9/2004 | Mittal | 455/432.3 |
| 2004/0192280 A1* | 9/2004 | Dalton et al. | 455/418 |
| 2005/0039178 A1* | 2/2005 | Marolia et al. | 717/168 |
| 2005/0086328 A1* | 4/2005 | Landram et al. | 709/220 |
| 2005/0101310 A1* | 5/2005 | Shachak | 455/418 |
| 2005/0101311 A1* | 5/2005 | Weitzman et al. | 455/419 |
| 2005/0204068 A1* | 9/2005 | Zhu et al. | 709/252 |

OTHER PUBLICATIONS

"SyncML Device Management Tree and Description", SYNCML Specification Document, Feb. 15, 2002, XP002963833, pp. 6-11.
"directory listing of www.3gpp.org-/ftp/lsg_t/WG2_Capability/TSGT2_15_Cancun/Docs/" Sep. 18, 2002, XP002357860.
"SyncML Device Management (SyncML DM)" 3GPP Meeting Document, Sep. 18, 2002, XP002357861.

(Continued)

*Primary Examiner*—Meless Zewdu
(74) *Attorney, Agent, or Firm*—Joseph T. Cygan

(57) ABSTRACT

A mobile device having a framework (901) comprising a logical device management tree (903), a device management engine (905), and a plurality of application specific logical device management sub-trees (907, 909) logically connected to the logical device management tree.

15 Claims, 7 Drawing Sheets

OTHER PUBLICATIONS

"Management of Wireless Dynamic Infrastructures" (ISCC 2003) Eighth IEEE International Symposium on Computers and Communication, Jun. 20-Jul. 3, 2003, Piscataway, NJ, XP010645962, pp. 1373-1378.

"SyncML DM: a SyncML Protocol for Device Management", SYNCML Presentation, Jan. 28, 2002, XP002357898.

"OSGi Service Platform Release 2—Chapter 2—Framework Specification", The Open Services Gateway Initiative Specification, Oct. 2001, XP002306195, pp. 11-31.

* cited by examiner

METHOD AND APPARATUS FOR DYNAMIC EXTENSION OF DEVICE MANAGEMENT TREE DATA MODEL ON A MOBILE

FIELD OF THE INVENTION

The present invention relates generally to the field of systems and methods for managing mobile electronic devices from a remote location. More particularly, the present invention relates to a system and method for updating applications and files of a wireless communication device via a wireless communication network.

BACKGROUND OF THE INVENTION

Computing devices may have different capabilities and features based on the applications installed in their memory. Firmware and applications may be pre-installed to a computing device before purchase by a customer or installed after purchase by a customer or service technician via a storage media, such as a magnetic or optical disk. For computing devices that communicate with a computer network, applications may be installed after a customer or service technician downloads the applications to the computing device.

Installations of applications and updates on wireless communication devices present other issues that are not a concern for wired devices. Users of wireless communication devices frequently need access to a variety of information, but such information is not as readily available as wired connections due to the limited bandwidth of wireless connections. Also, the amount of data transferred to and from a wireless communication device should be minimized in order to minimize power drain on the device's power source. Thus, wireless communication systems are challenged to maximize the quality of information provided to wireless communication devices while minimizing the power restrictions imposed on the wireless device as well as the length of time it may take to upload large segments of information.

Systems and methods for repairing and upgrading software on wireless devices are known, but such systems and methods may deal with updates of monolithic firmware as well as updates of high-level and mid-level applications. Mobile devices are currently evolving toward use of full blown Operating Systems (OS), for example Linux and Windows. However, upgrade and repair is usually performed with respect to monolithic rather than componentized software. Therefore, the industry is lacking in devices and methods with support of component specific upgrade and repair capabilities.

Additionally, device management information accessible to system operators from mobile devices is limited to the mobile device's design and what was included during manufacturing, particularly with respect to monolithic software designs. Therefore, system operators cannot adjust mobile devices efficiently during the mobile device life cycle. These issues limit system operators' customer care capabilities and diagnostics.

Therefore, a need exists for an apparatus and method for enabling dynamic extension of a mobile device logical device management tree.

DETAILED DESCRIPTION OF THE PREFERRED EMBODIMENTS

To address the above-mentioned need, an apparatus and method for enabling dynamic extension of a mobile device logical device management tree is provided herein.

In accordance with the present invention, an application may be installed on a mobile device and provide system information for an application-specific device management sub-tree. The applications may be JAVA applications, other application having various aspects of JAVA, or native applications.

In embodiments of the present invention, a mobile device comprises a framework having a logical device management tree. The logical device management tree comprises multiple application-specific sub-trees that may be installed dynamically and after the mobile device is deployed in the field. The sub-tree information may be transferred as a bundle in which metadata related to the application-specific sub-tree, scripts, and plug-ins may be contained. The scripts may be for initialization as well as for later un-installation of the application.

The mobile device of the present invention has several advantages including easy and secure access to the device management data, provisioning via a SyncML server, and better fault tolerance for maintaining data integrity during catastrophic events.

One aspect of the present invention is a wireless communication network comprising a server that generates a patch which identifies one of a same command, a change command and a difference command. The same command indicates an unchanged file. The change command indicates a changed file. The difference command indicates that data submitted in this command has been differenced by a file-level difference based on a file extension.

Another aspect of the present invention is a wireless communication device comprising a transceiver and a processor, and method thereof. The transceiver receives a patch from a remote device. The processor scans the patch for any difference commands indicating that data submitted in this command has been differenced by a file-level difference based on a file extension.

Figure 1:
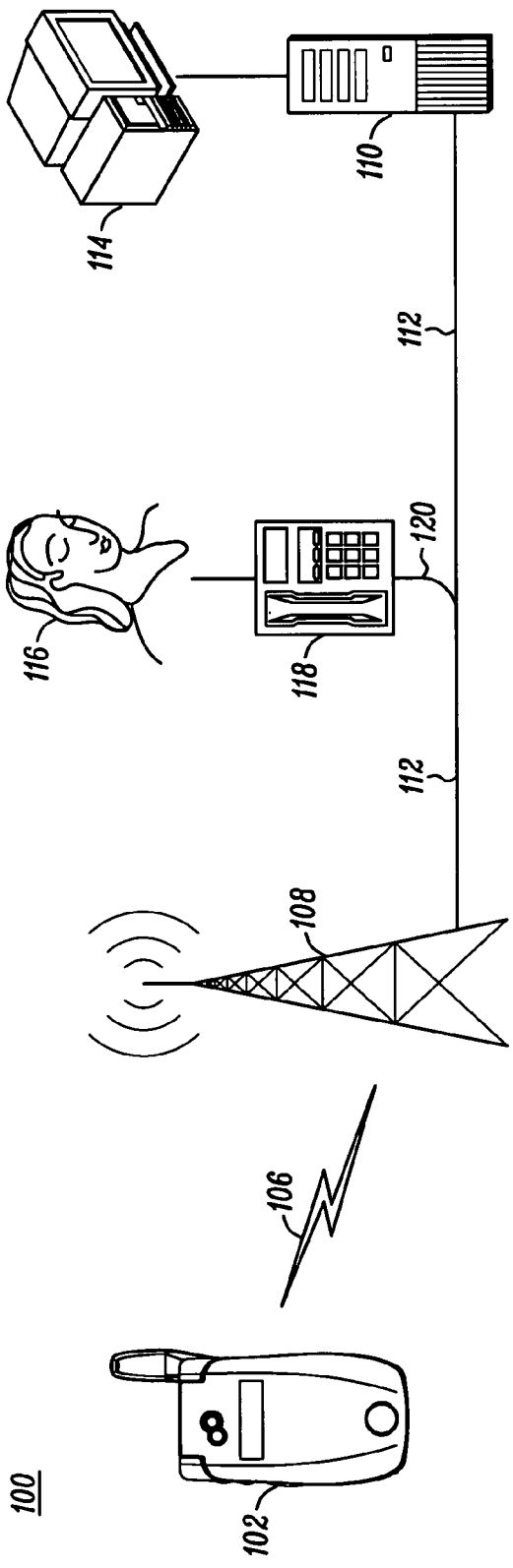
FIG. 1 is a schematic view illustrating an embodiment of a wireless communication system in accordance with the present invention.

Referring to FIG. 1, there is provided a schematic view illustrating an embodiment of a wireless communication system 100. The wireless communication system 100 includes a wireless communication device 102 communicating with a wireless communication network 104 through a wireless link 106. Any type of wireless link 106 may be utilized for the present invention, but it is to be understood that a high speed wireless data connection is preferred. For example, the wireless communication network 104 may communicate with a plurality of wireless communication devices, including the wireless communication device 102, via a cellular-based communication infrastructure that utilizes a cellular-based communication protocols such as AMPS, CDMA, TDMA, GSM, iDEN, GPRS, EDGE, UMTS, WCDMA and their variants. The wireless communication network 104 may also communicate with the plurality of wireless communication devices via a peer-to-peer or ad hoc system utilizing appropriate communication protocols such as Bluetooth, IEEE 802.11, IEEE 802.16, and the like.

The wireless communication network 104 may include a variety of components for proper operation and communication with the wireless communication device 102. For example, for the cellular-based communication infrastructure shown in FIG. 1, the wireless communication network 104 includes at least one base station 108 and a server 110. Although a variety of components may be coupled between one or more base stations 108 and the server 110, the base station and server shown in FIG. 1 is connected by a single wired line 112 to simplify this example.

The server 110 is capable of providing services requested by the wireless communication device 102. For example, a user of the device 102 may send a request for assistance, in the form of a data signal (such as text messaging), to the wireless communication network 106, which directs the data signal to the server 110. In response, the server 110 may interrogate the device and/or network state and identify one or more solutions. For those solutions that require change or correction of a programmable module of the device 102, the server 110 may send update data to the device via the wireless link 106 so that the programmable module may be updated to fulfill the request. If multiple solutions are available, then the server 110 may send these options to the device 102 and await a response from the device before proceeding.

The wireless communication system 100 may also include an operator terminal 114, managed by a service person 116, which controls the server 110 and communicates with the device 102 through the server. When the server 110 receives the request for assistance, the service person may interrogate the device and/or network state to identify solution(s) and/or select the best solution if multiple solutions are available. The service person 116 may also correspond with the device 102 via data signals (such as text messaging) to explain any issues, solutions and/or other issues that may be of interest the user of the device.

The wireless communication system 100 may further include a voice communication device 118 connected to the rest of the wireless communication network 104 via a wired or wireless connection, such as wired line 118, and is available for use by the service person 116. The voice communication device 118 may also connect to the network via the server 110 or the operator terminal 114. Thus, in reference to the above examples, a user of the device 102 may send a request for assistance, in the form of a voice signal, to the wireless communication network 106, which directs the data signal to the server 110. While the server 110 and or the service person 116 is interrogating the device and/or network state, identifying one or more solutions, and/or selecting an appropriate solution, the service person may correspond with the device 102 via voice signals to explain any issues, solutions and/or other issues that may be of interest the user of the device.

Figure 2:
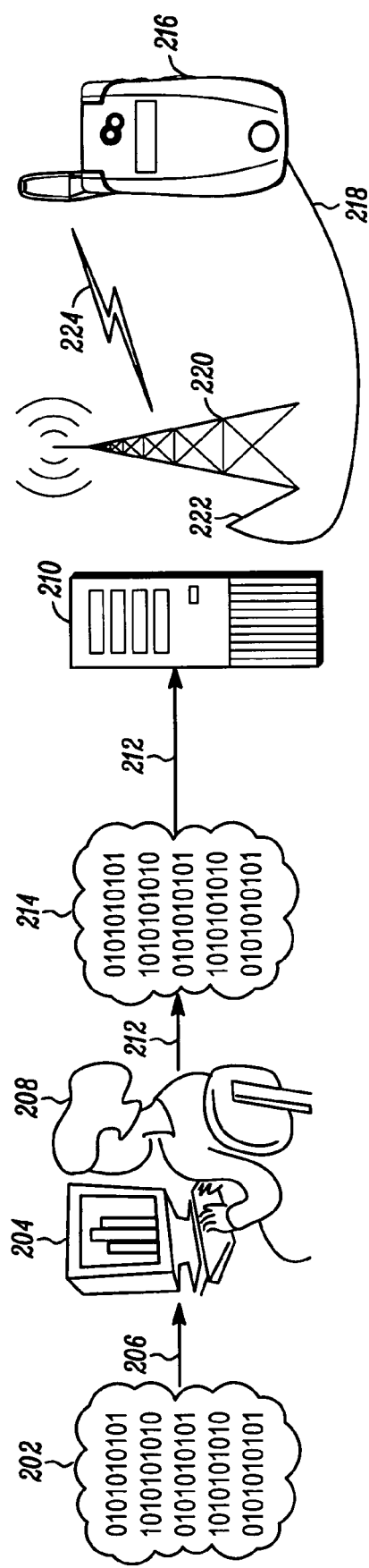
FIG. 2 is a schematic view illustrating another embodiment of the wireless communication system in accordance with the present invention.

Referring to FIG. 2, there is provided a schematic view illustrating another embodiment of the wireless communication system. For this embodiment, operator requirements 202 are received by a service terminal 204 via a first connection 206 and a service person 208 operates the service terminal 204, if necessary. For example, the service person 208 may provide information about a desired operator and/or needs of a device user so that the appropriate operator requirements 202 are received. The service terminal 204 may optionally be connected to a server 210 by a second connection 212. Regardless of whether the server 210 is used, the service terminal 204 generates appropriate components that should be sent to a wireless communication device 216 operated by the user in accordance with the operator requirements 202 and associated information. The device 216 may be coupled to the service terminal 204 or the server 210 via a wired connection 218, such as a cable or cradle connection to the device's external connector, or a wireless connection. The wireless connection may include a wireless communication network that includes a base station 220 connected to the service terminal 204 or the server 210 and a wireless link 224 communication with the device 216.

Figure 3:
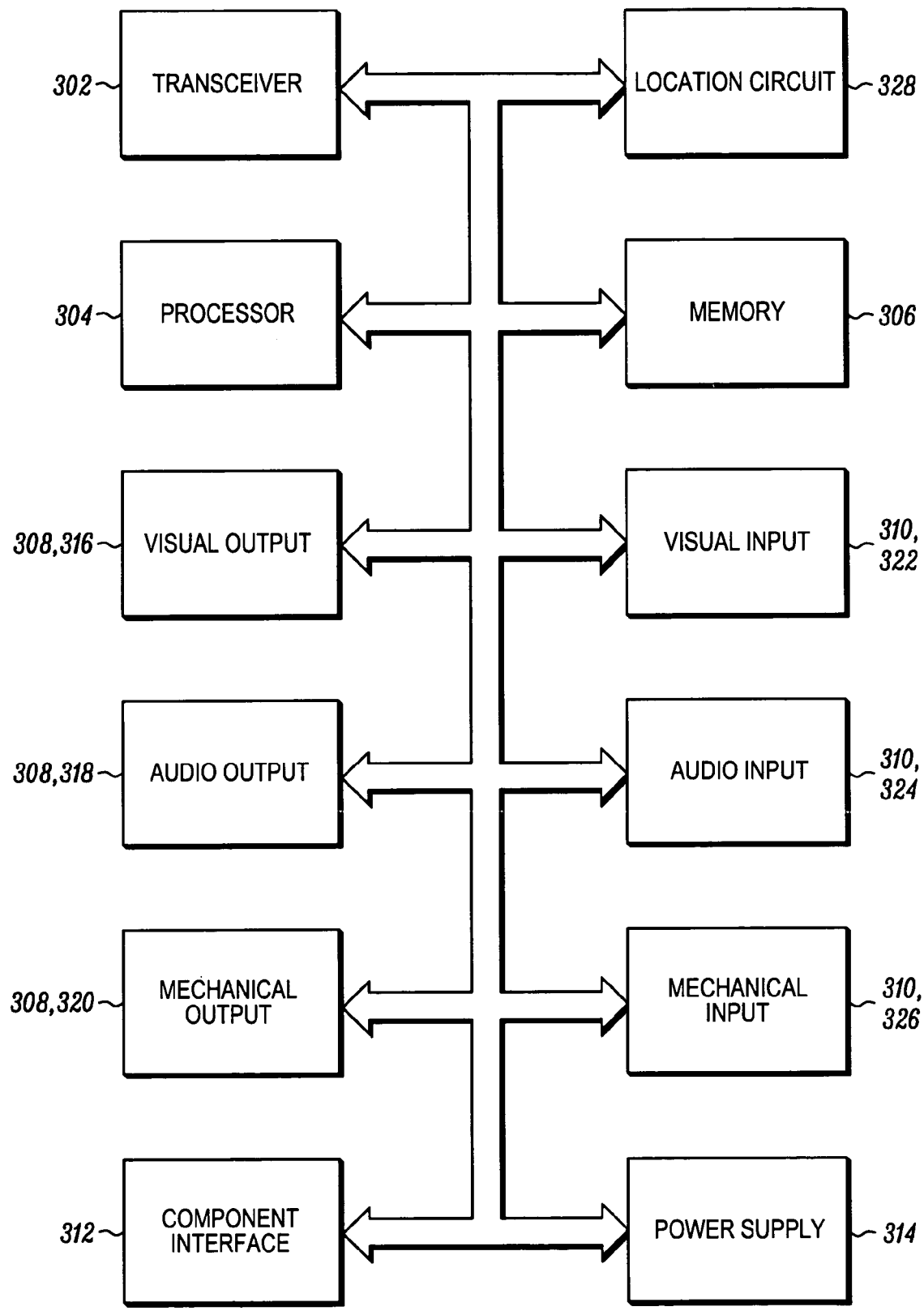
FIG. 3 is a block diagram illustrating exemplary internal components of various servers, controllers and devices that may utilize the present invention.

Referring to FIG. 3, there is provided a block diagram illustrating exemplary internal components of various servers, controllers and devices that may utilize the present invention, such as the wireless communication devices 102, 316 and the servers 110, 310 of FIGS. 1 and 2. The exemplary embodiment includes one or more transceivers 302, a processor 304, a memory portion 306, one or more output devices 308, and one or more input devices 310. Each embodiment may include a user interface that comprises at least one input device 310 and may include one or more output devices 308. Each transceiver 302 may be a wired transceiver, such as an Ethernet connection, or a wireless connection such as an RF transceiver. The internal components 300 may further include a component interface 312 to provide a direct connection to auxiliary components or accessories for additional or enhanced functionality. The internal components 300 preferably include a power supply 314, such as a battery, for providing power to the other internal components while enabling the server, controller and/or device to be portable.

Referring to the wireless communication devices 102, 316 and the servers 110, 310 of FIGS. 1 and 2, each machine may have a different set of internal components. Each server 110, 310 may include a transceiver 302, a processor 304, a memory 306 and a power supply 314 but may optionally include the other internal components 300 shown in FIG. 2. The memory 306 of the servers 110, 310 should include high capacity storage in order to handle large volumes of media content. Each wireless communication device 102, 316 must include a transceiver 302, a processor 304, a memory 306, one or more output devices 308, one or more input devices 310 and a power supply 314. Due to the mobile nature of the wireless communication devices 102, 316, the transceiver 302 should be wireless and the power supply should be portable, such as a battery. The component interface 312 is an optional component of the wireless communication devices 102, 316.

The input and output devices 308, 310 of the internal components 300 may include a variety of visual, audio and/or mechanical outputs. For example, the output device(s) 308 may include a visual output device 316 such as a liquid crystal display and light emitting diode indicator, an audio output device 318 such as a speaker, alarm and/or buzzer, and/or a mechanical output device 320 such as a vibrating mechanism. Likewise, by example, the input devices 310 may include a visual input device 322 such as an optical sensor (for example, a camera), an audio input device 324 such as a microphone, and a mechanical input device 326 such as a flip sensor, keyboard, keypad, selection button, touch pad, touch screen, capacitive sensor, motion sensor, and switch.

The internal components 300 may include a location circuit 328. Examples of the location circuit 328 include, but are not limited to, a Global Positioning System (GPS) receiver, a triangulation receiver, an accelerometer, a gyroscope, or any other information collecting device that may identify a current location of the device.

The memory portion 306 of the internal components 300 may be used by the processor 304 to store and retrieve data. The data that may be stored by the memory portion 306 include, but is not limited to, operating systems, applications, and data. Each operating system includes executable code that controls basic functions of the communication device, such as interaction among the components of the internal components 300, communication with external devices via the transceiver 302 and/or the component interface 312, and storage and retrieval of applications and data to and from the memory portion 306. Each application includes executable code utilizes an operating system to provide more specific functionality for the communication device, such as file system service and handling of protected and unprotected data stored in the memory portion 306. Data is non-executable code or information that may be referenced and/or manipulated by an operating system or application for performing functions of the communication device.

The processor 304 may perform various operations to store, manipulate and retrieve information in the memory portion 306. Each of the internal components 300 is not limited to a single component but represents functions that may be performed by a single component or multiple cooperative components, such as a central processing unit operating in conjunction with a digital signal processor and one or more input/output processors. Likewise, two or more components of the internal components 300 may be combined or integrated so long as the functions of these components may be performed by the communication device.

Figure 4:
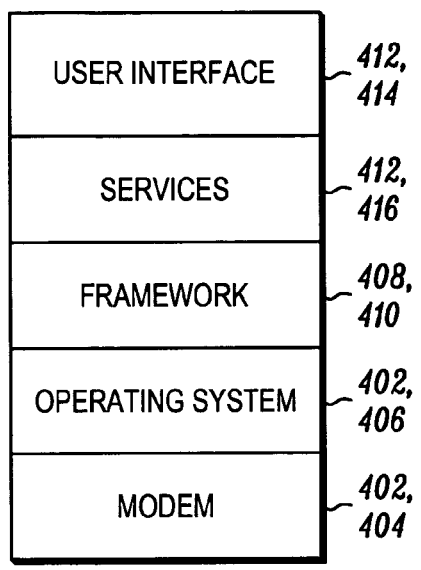
FIG. 4 is a block diagram representing the functional layers of a client device in accordance with the present invention.

In accordance with the present invention, an expansion of known frameworks for more suitability to a wireless device operability is disclosed herein. FIG. 4, illustrates a basis architecture of a mobile device in accordance with the present invention. Existing known mobile devices are typically architected such that applications are loaded on top of a fixed base platform. APIs for applications are fixed at manufacture. Therefore it is not possible to postpone, for example, new media types and/or other upgrades. Turning to FIG. 4, a mobile device of the present invention utilizes an open OS, such as for example, Linux or Windows. Additionally, a modem interface is abstracted such that it is agnostic to the particular interface, for example radio interfaces such as GSM, CDMA, UMTS, etc. that would traditionally utilize dedicated functionality.

In some embodiment of the present invention, JAVA services are utilized to create an adapted framework for wireless communications. In accordance with the present invention, JAVA as well as native applications, for example a browser, can be completely customized.

Referring to FIG. 4, there is provided a block diagram generally representing functional layers 400 included in the memory portion 306 (shown in FIG. 3) of a client device, such as the wireless communication device 102, 216. The functional layers 400 include low-level layers 402 including a modem layer 404 and an operating system layer 406, a mid-level layer 408 also known as a framework layer 410, and high-level layers 412 including a user interface layer 414 and a services layer 416. The modem layer 404 may be an abstracted interface to a modem circuit of the client device in which services are accessed through message passing. The modem layer 404 may be air-interface agnostic, i.e., may operate using a wide variety of air interface protocols. The modem layer 404 may also be an abstracted interface to an RTOS, and executive application programming interfaces (API's) may be encapsulated in a thin interface layer. Further, the modem code may be on a separate processor or co-resident with application code.

The operating system layer 406 operates above the modem layer 404 and provides basic platform services for the client device, such as process management, memory management, persistent storage (file system), Internet networking (TCP/IP), and native access security and application-to-application protection. The operating system layer 406 may expose native services based upon standards-defined API's (POSIX). The operating system layer 406 may host native applications, such as system daemons, specific-language interpreters (such as JAVA), and second-party native applications (such as a browser). Daemons are executable code that run as separate background processes and provide services to other executable code(s) or monitor conditions in the client device.

The framework layer 410 provides an operable interface between the low-level layers 402 and the high level layers 412 that provides ample opportunities for current and future functions and, yet, is efficient enough to avoid provide unnecessary code that may waste precious memory space and/or slow-down the processing power of the client device. Key features of the framework layer 410 may include, but are not limited to, hierarchical class loaders, application security, access to native services, and compilation technology for performance. Although the operating system layer 406 may host system daemons and specific-language interpreters, the framework layer 410 should actually include such system daemons and specific-language interpreters. The framework layer 410 may also include a framework for managing a variety of services and applications for the client device. For one embodiment, the framework layer 410 is an always-on CDC/FP/PBP JVM, OSGi framework.

The services layer 416 is adapts the framework layer 410 to wireless communication services. The services layer 416 includes services packaged in modular units that are separately life-cycle managed (e.g., start, stop, suspend, pause, resume); are separately provisioned, upgraded and withdrawn; and abstracts the complexity of the service implementation from a user of the client device. Services are modular, extensible and postponeable so that, within the services layer 416, services may be added, upgraded and removed dynamically. In particular, the services layer 416 includes a lookup mechanism so that services may discover each other and applications may discover services used by other services, e.g., service provider interfaces (SPI's), and services used by applications, e.g., application programming interfaces (API's).

An API is a formalized set of function and/or method calls provided by a service for use by a client device, whereas an SPI is a set of interfaces and/or methods implemented by a delegated object (also called provider) providing an API to the client device. If an API is offering methods to client devices, more API's may be added. Extending the functionality to offer more functionality to client devices will not hurt them. The client device will not use API's that are not needed. On the other hand, the same is not true for SPI's. For SPI's, the addition of a new method into an interface that others must provide effectively breaks all existing implementations.

The user interface layer 414 manages applications and the user interface for the client device. The user interface layer 414 includes lightweight applications for coordinating user interaction among the underlying services of the services layer 416. Also, the user interface layer 414 is capable of managing native applications and language-specific application, such as JAVA. The user interface layer 414 creates a unifying environment for the native applications and the language-specific applications so that both types of applications have a similar "look and feel". The native applications utilize components of a native toolkit, and the language-specific applications utilized components of a corresponding language-specific toolkit. For the user interface layer 414, a language-specific user interface toolkit is built on the native toolkit, and MIDlets are mapped to the language-specific user interface toolkit.

Figure 5:
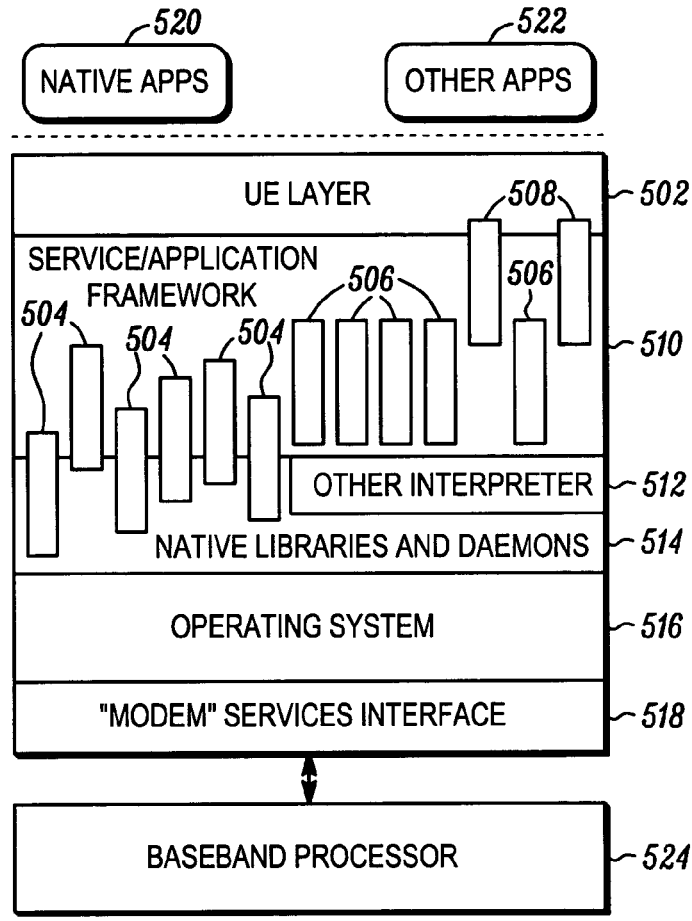
FIG. 5 is a block diagram illustrating an embodiment of the functional layers of the client device in accordance with the present invention.

FIG. 5 illustrates details of a mobile device architecture, having dual processors, in accordance with some embodiments of the present invention. In FIG. 5 a Service/Application Framework provides services such as but not limited to; messaging, security, DRM, device management, persistence, synchronization, and power management. An abstracted modem service interface communicates with the baseband processor, wherein the baseband processor may communicate over any suitable radio interface. In FIG. 5, the UE Layer, may be implemented for example in Java. The Operating System is an open operating system and may utilize for example Linux or Windows.

Unlike prior art architectures, as previously mentioned, wherein applications are loaded on top of a fixed base platform, applications as shown in the embodiments illustrated by FIG. 5 are architected in a more flexible structure. In accordance with the embodiments of FIG. 5, application and feature upgrades, new content types, new standards-based upgrades, new operator specific service libraries, and component upgrade and repair are facilitated.

Referring to FIG. 5, there is provided a block diagram illustrating a first client embodiment 500 included in the memory portion 306 of the client device, such as the wireless communication device 102, 216. The first client embodiment 500 includes a UE layer 502, a plurality of services 504, 506, 508, a service/application framework 510, an other or language-specific interpreter 512 (such as JAVA Virtual Machine), native libraries and daemons 514, an operating system 516, and a modem services interface 518. The UE layer 502 interacts with native applications 520 and language-specific applications 522, such as JAVA. The modem services interface interacts 518 with a baseband processor 524 of the client device.

The applications are user-initiated executable code whose lifecycle (start, stop, suspend, pause, resume) may be managed. The applications may present a User Interface and/or may use services. Each daemon is an operating system (OS) initiated, executable code that runs as a separate background process. Daemons may provide services to other executable code or monitor conditions in the client.

Of particular interest is the organizational cooperation of the services 504, 506, 508 with the mid-level layer 408 which includes the service/application framework 510, the language-specific interpreter 512 and the native libraries and daemons 514 as well as the UE layer 502. As represented by FIG. 5, the types of available services include native-based services 504 which rely on one or more components of the native libraries and daemons 514, language-specific services 506 which rely on components associated with the language-specific interpreter 512, and native or language-specific services 508 that further rely on components of the UE layer 502.

A service is a set of functionality exposed via a well-defined API and shared among applications. A service has as least two characteristics, namely a service interface and a service object. The service interface is the specification of the service's public methods. The service object implements the service interface and provides the functionality described in the interface. A service may provide methods that present a User Interface. Invoking a method on a service is done in the caller's context (thread/stack). Services may return a value to the requesting client by depositing it on the caller's stack, unlike an invoked application. The implementation of the service may be replaced without affecting its interface Examples of services include, but are not limited to, messaging, security, digital rights management (DRM), device management, persistence, synchronization and power management.

A system service is a low-level service specific to an operating system or MA and is not part of the abstract set of services exposed to platform components. System service APIs should not be used by any component that is intended to portable across all instantiations of the platform. A framework service is a service that exposes a higher level abstraction over system services and provides OS-independent and MA-independent access to infrastructure components and services. An application service is a service that exposes application-specific functionality (both UI and non-UI) via a well defined API. A native service is a service written in native code.

A library is a set of services contained in an object that can either be statically linked or dynamically loaded into executable code. Library services may invoke other library services or services contained in daemons, which are external to the library and may also run in a different process context.

Figure 6:
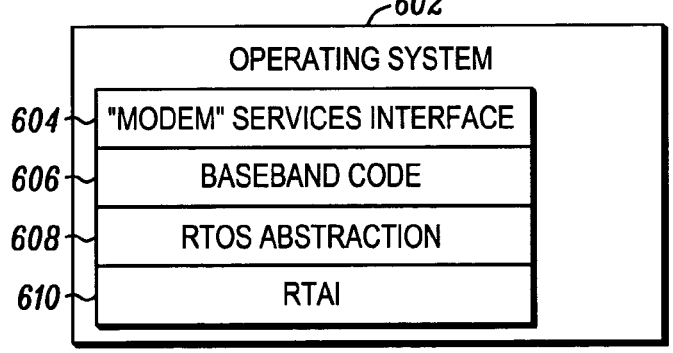
FIG. 6 is a block diagram illustrating another embodiment of the lower level functional layers of the client device in accordance with the present invention.

Referring to FIG. 6, there is provided a block diagram illustrating a second client embodiment 600 of the lower level functional layers of the client device. The first client embodiment 500 represents a dual processor architecture of a client device, whereas the second client embodiment 600 represents a single core architecture of a client device. For the second client embodiment 600, the operating system 602 includes the modem services interface 604 and a baseband code 606. In addition, the operating system 602 may include other components, such as an RTOS abstraction 608 and an RTAI 610.

Figure 7:
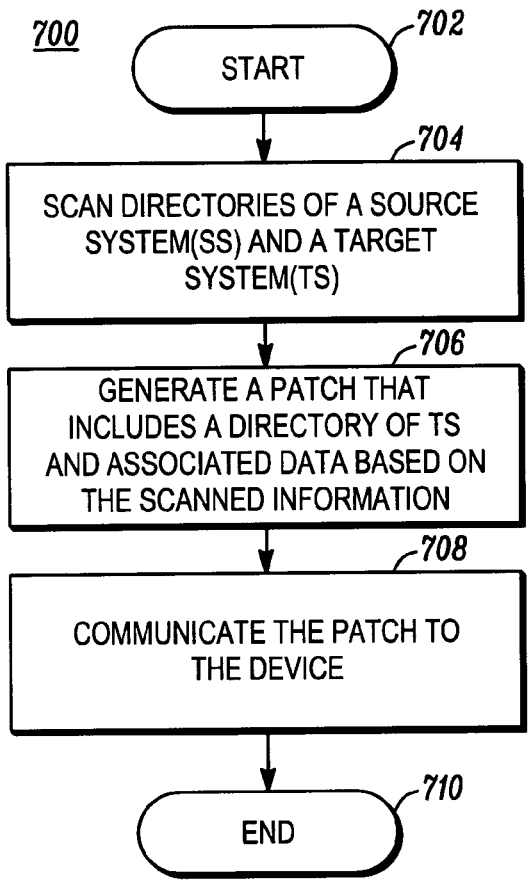
FIG. 7 is a flow diagram illustrating, from a network view, an over-the-air (OTA) repair process in accordance with the present invention.

Referring to FIG. 7, there is provided a flow diagram illustrating a network over-the-air (OTA) repair process 700. The network OTA repair process 700 applies to firmware of the memory portion 306 of a client device, such as a wireless communication device 102, 216. In particular, the present invention is applicable to componentized operating systems, such as Linux and Microsoft® Windows®, and operates to identify components changes and make selective changes. Componentized operating systems typically use a particular file system for repair processes of the operating system (OS) itself, applications, configuration parameters, language packs, animations, etc., that are generally flashed onto a target device as a whole. For example, the Linux operating system uses CRAMFS, a widely popular compressed read-only file system. The OTA repair process of the present invention patches the file system of each OS that is based on file-level updates of the system, as well as extensible framework for sub-file-level differencing, allowing for further optimization.

The differencing engine takes to file system images as its inputs, identifies changed files, differences the files for which this second-level differencing is supported, and creates a patch. The patch includes of skeletal (i.e. devoid of actual block references) directory entries of the target image, accompanied by one of three possible data object types: (1) data of the new file for new files, or ones not supporting intra-file differencing; (2) block information of an existing file for ones that didn't change; and (3) patch for the file for those supporting intra-file differencing.

When a file is downloaded, it is pre-processed in an OS mode so that all elements of type 3 are converted to elements of type 2. Also, memory-location-sensitive files are processed as type 3 entries. The most complex manipulations occur under auspices of an OS, benefiting from all its services. The pre-processing, which also allows for de-compressing and compressing the files, is also applicable to a compressed OS kernel.

The network OTA repair process 700 creates compact patch files that may be downloaded to client devices and subsequently applied to the devices in an IDL mode. The differencing process is implemented as a two-level framework. At the first level, the network OTA repair process 700 starts at step 702, and directories of the source system (SS) and target system (TS) are scanned at step 704. Next, corresponding data is compared and the resulting patch is generated at step 706. The resulting patch is comprised of the directory of TS, with data containing commands and data of one of the following types:

"same" command, indicating that file has not changed, and pointing to the blocks of the files in SS;

"change" command, for the files that have changed, accompanied by a number of unchanged initial blocks, if any; one or more pointers to unchanged blocks in SS; and data for the changed blocks; and a difference command ("filediff"), indicating that the data submitted in this command has been differenced by a file-level difference based on a file's extension. Data for this command includes the type of the diff component used and file-level patch data.

Once the patch is downloaded to the client device under a running OS at step 708, the network OTA repair process 700 terminates at step 710.

Figure 8:
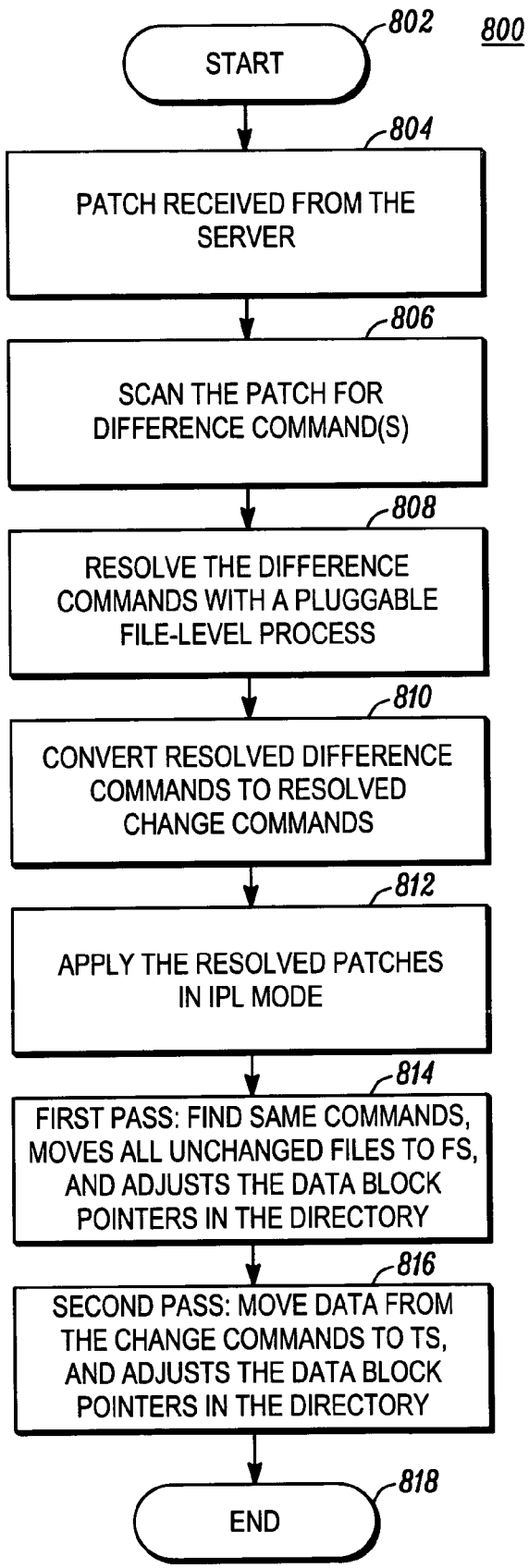
FIG. 8 is a flow diagram illustrating, from a client device view, the OTA repair process of FIG. 7.

Referring to FIG. 8, there is provided a flow diagram illustrating a client OTA repair process. The client OTA repair process starts at step 802, and the client device receives the patch from the network at step 804 and scans the patch for difference commands at step 806. The difference commands are then resolved with pluggable file-level processes at step 808 and converted into "change" commands at step 810. In this manner, complex file-level processes may be designed in a way that allows use of the OS (rather than doing it in IPL mode).

The "resolved" patches are then applied in IPL mode at step 812. Application of the patch occurs in IPL mode in two passes: (1) all unchanged file data is moved to the beginning of the file system data area; and (2) all new/updated file data is written, in-memory directory updated, then written onto the memory. In particular, the patch application requires the following two passes of the patch file. First, the "same" commands are identified, all the unchanged files are then moved in the file system (FS), and thereafter the data block pointers are adjusted in the directory at step 814. Second, the data is moved from the "change" commands into the TS, and then the data block pointers are adjusted in the directory at step 816. Thereafter, the client OTA repair process terminates at step 818.

Implementation of the idea will allow changes to the OS components as well as both native and language-specific applications initially deployed in the factory during manufacture or at the distribution center during distribution.

Figure 9:
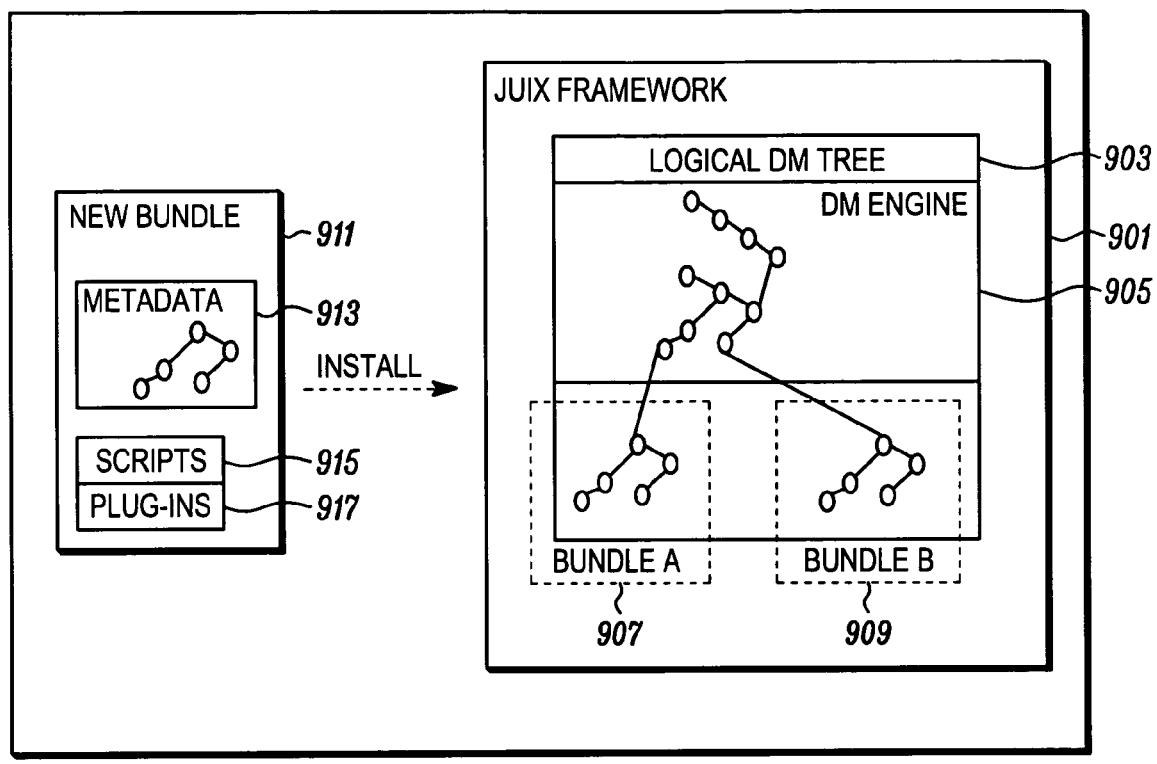
FIG. 9 is a block diagram illustrating a device management tree process for the wireless communication system in accordance with the present invention.

FIG. 9 illustrates dynamic definition of new branches of a device management tree (DMT) in accordance with some embodiments of the present invention. In FIG. 9 a mobile device comprises a framework 901, having a logical device management tree 903.

During installation of a mobile device application, a bundle 911 may be transmitted to the mobile device. The bundle 911 may contain a variety of application-specific information such as metadata 913, scripts 915, and plug-ins 917. The scripts 915 may be SyncML DM scripts for initializing during install, and clean-up during uninstall of mobile device applications.

During an installation procedure, DMT service examines bundle 911 for DM extension information, such as metadata 913, scripts 915 and plug-ins 917. Accordingly, a new application or service "packagedescriptor.xml" file or "servicedescriptor.xml" file respectively, will contain the declaration: <dmt-extension-path>folder_name</dmt-extension-path>. For this declaration, "folder name" is a relative pathname inside a ".jar" file to a folder having DM extension information.

The DMT service will use the pathname to look for files such as for example; "subtree.mdf," "installScript.xml," "uninstallScript.xml," and "plugin1.so," "plugin2.so," . . . "plugin(n).so" for n-number of plug-ins. The plug-ins are shared object files that are to be installed with the bundle 911.

The above described simple format, which predefines all file names, eliminates the necessity for introducing a registry. As a further result, DM engine 905 implementation and bundle 907, 909, 911 creation are simplified.

Figure 10:
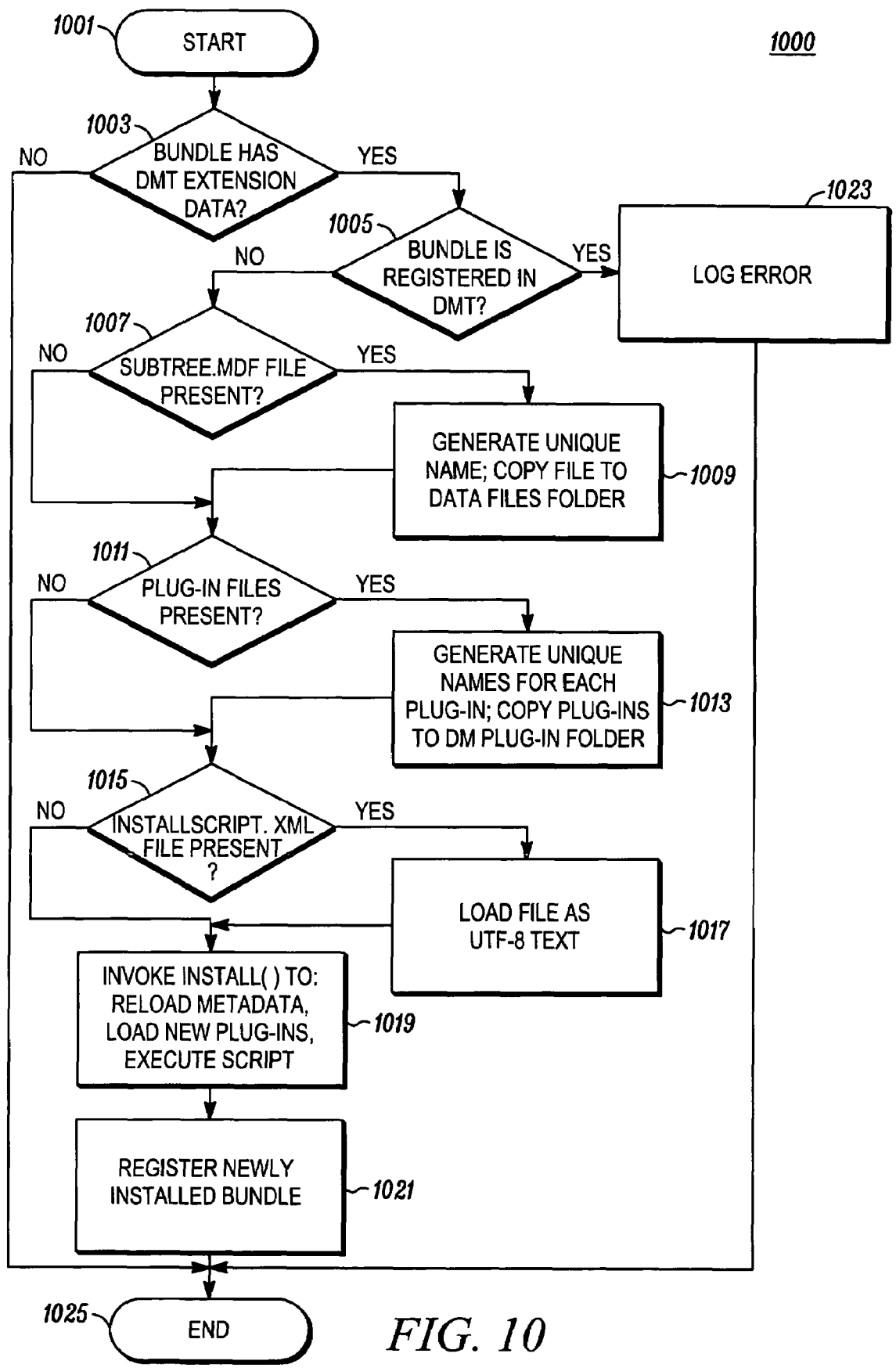
FIG. 10 is a flow diagram illustrating a first embodiment of the device management tree process of FIG. 9.

In accordance with the present invention, DM engine implementation involves registration of a listener for "install"/"uninstall" notifications for the OSGi framework. The DM engine implementation is illustrated in FIG. 10, wherein the install/uninstall listener is registered in block 1001. In block 1003, the DM engine 905 analyses the "dmt-extension-path" attribute of bundle 911. If the attribute is set, then the bundle 911 might contain dynamic metadata. If the attribute is not set, the DM engine ends its analysis for that particular bundle as shown in block 1025.

Assuming that the "dmt-extension-path" attribute is set, the DM engine determines whether the bundle has been previously registered in the DMT in block 1005. If the bundle has been registered, a log error 1023 is generated and the DM engine ends bundle analysis as shown in block 1025.

If no previous bundle registration exists, then the DM engine proceeds to search for file types as shown in block 1007, wherein the presence of a "subtree.mdf" file is determined. If a "subtree.mdf" file is present, then in block 1009 the DM engine generates a new unique filename and copies metadata from the ".mdf" file to the newly created file. Additionally, a default location for metafiles may be used for example, "$(dm_setting_root)/a/PhoneVendor/settings." Because the DM engine supports meta-information in multiple files as illustrated in FIG. 9, the new metadata will automatically be loaded during the subsequent start-up. However, a special function may be introduced to load the metadata in the currently active session.

After the metadata has been copied as shown in block 1009, or if no "subtree.mdf" file was found, the DM engine looks to the bundle for plug-in files as shown in block 1011. If the bundle contains plug-in files, then the DM engine generates a new unique filename for each one and copies each one to a predefined location, for example the default folder "$(dm_setting_root)/plugins/" as shown in block 1013. The DM engine will load the plug-ins from this predefined location automatically during the subsequent start-up, or the engine may be forced to load them during the current session via a special function.

After the plug-ins have been copied as shown in block 1013, or if no plug-in files were found, the DM engine looks to the bundle for script files, such as an "InstallScript.xml" file, as shown in block 1015. If the bundle contains script files, the script files are loaded as text in block 1017. In some embodiments, this text file is a utf-8 text file.

After the script files have been copied as shown in block 1015, or if no script files were found, a special function in the native part of the engine is called as shown in block 1019. The function sends an event to all other process using the DM engine to load new plug-ins and update metadata. The function may also cause execution of scripts.

In block 1021, the DM engine registers the newly installed dynamic metadata in the DMT using a location, for example, "./DevDetail/Ext/Conf/DMExtensions." Additionally, a bundle ID and any unique meta-file and plug-in file names generated in blocks 1009 and 1013 respectively, are stored for purposes of performing a clean un-install process at a later time.

The DM implementation ends in block 1025 at which time the new sub-tree is attached to the DMT, similar to sub-trees corresponding to "Bundle A" and "Bundle B" as shown in FIG. 9. The new sub-tree may then be accessed by a server or by applications.

Figure 11:
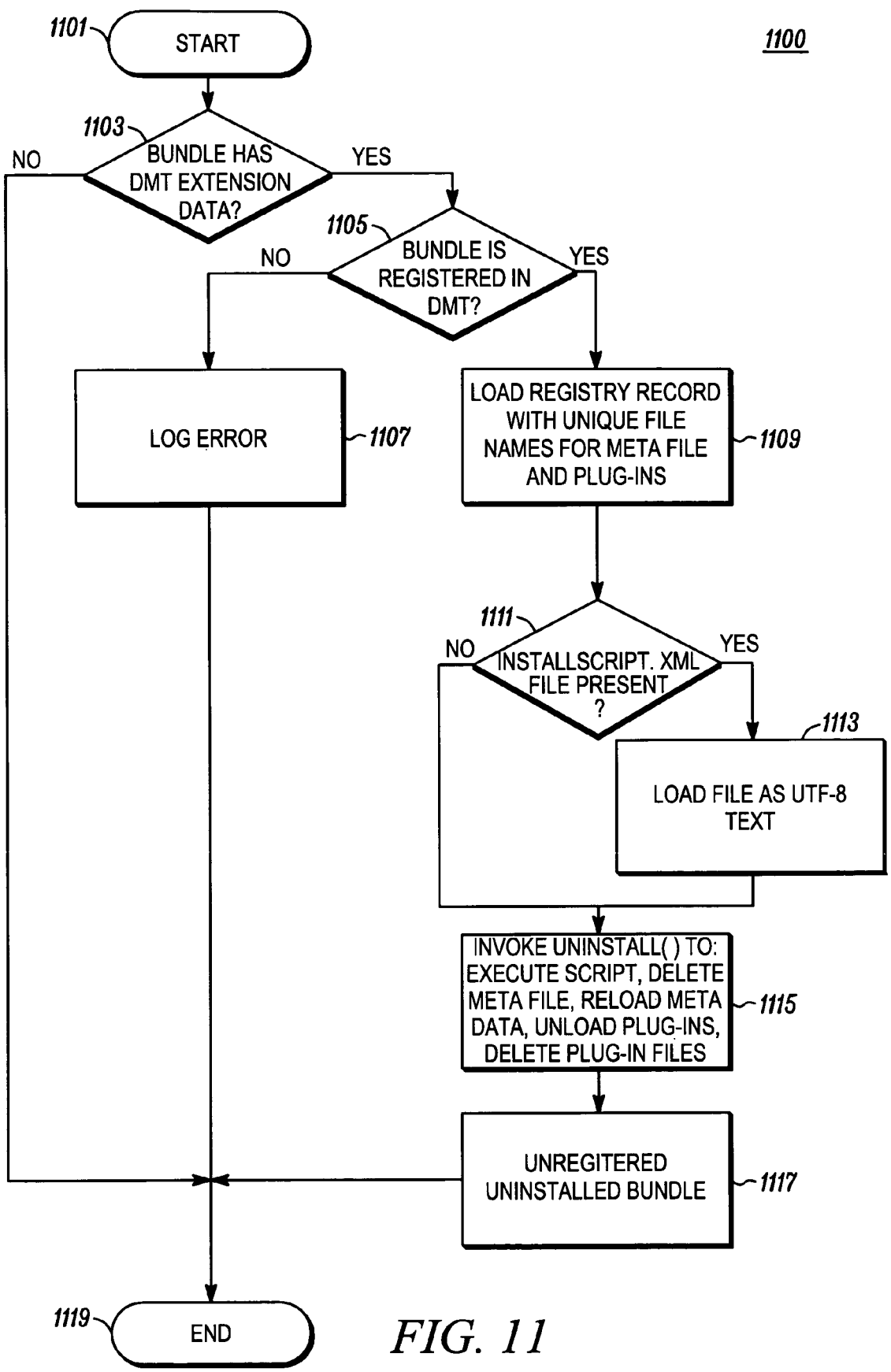
FIG. 11 is a flow diagram illustrating a second embodiment of the device management tree process of FIG. 9.

FIG. 11 is a flow diagram illustrating an uninstall procedure for applications on a mobile device in a accordance with the present invention. In block 1101, the DM engine must begin a lookup for the register record that stores the metafile and plug-in file names. In block 1103, the DM engine looks for DMT extension data. If no DMT extension data existed then the DM engine ends at block 1119.

If the application to be uninstalled comprised DMT extension data, then the engine checks the DMT registration in block 1105. If no registration is found, an log error is generated in block 1107, and the engine ends the uninstall at block 1119. If registration data is found in block 1105, then the registry record, which comprises the previously generated unique metafile and plug-in file names, is loaded as shown in block 1109.

The engine then looks for an uninstall script, for example an "UninstallScript.xml" file. If such a file exists, then it is loaded at text in block 1113. In some embodiments the script file is loaded as a utf-8 type text file. Whether or not an uninstall script is loaded in block 1113, a special function in the native part of the engine is called to complete the un-installation process as shown in block 1115.

In block 1115, any loaded scripts are executed and metadata files are deleted. The native function also sends an event to all other processes using the DM engine to unload plug-ins and update the metadata file by a reloading operation. Therefore, in block 1115, the metadata file is reloaded without the metadata of the uninstalling application. Further, the associated plug-in files are unloaded and deleted. In block 1117, the DM engine un-registers the uninstalled dynamic metadata in the DMT by deleting the corresponding DMT record.

Lastly, in block 1119, the sub-tree is detached from the DMT and can no longer be accessed by servers or applications.

In summary, the embodiments of the present invention enable dynamic definition of new branches to a DMT, population of the branches with data, and/or providing of plug-ins to abstract away the physical data sources. All necessary information is delivered to a mobile device as part of a bundle, and contained in a directory referenced by a special entry in the bundle descriptor as previously described herein.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A mobile station comprising:
    an abstracted modem interface module, agnostic to any specific radio interface and configurable to interface with a plurality of different radio interfaces;
    an open operating system coupled to said modem interface module, said operating system configured to host, and to provide standard application programming interfaces (APIs) to,
    a plurality of native applications;
    a framework layer coupled to said open operating system, said framework layer comprising:
        a logical device management tree;
        a plurality of application specific logical device management sub-trees logically connected to the logical device management tree, said sub-trees configured to be upgraded individually and further configured to be interchangeable as a bundle; and
        a device management engine.

2. The mobile station of claim 1, wherein said native applications are JAVA based applications and further comprising:
    a second set of JAVA based applications;
    a layer coupled to said framework layer, said native applications and said second set of JAVA based applications, said layer having communications to a plurality of services, said services being initiated by said open operating system.

3. The mobile station of claim 2, wherein each of the plurality of application specific logical device management sub-trees comprises metadata.

4. The mobile station of claim 2, wherein each of the plurality of application specific logical device management sub-trees comprises initialization scripts.

5. The mobile station of claim 2, wherein each of the plurality of application specific logical device management sub-trees comprises plug-ins.

6. The mobile station of claim 4, wherein the initialization scripts are XML scripts.

7. A method of updating a device management tree (DMT) on a mobile device application framework comprising:
- receiving by a mobile station a bundle associated with an installable application;
- determining that the bundle contains DMT data;
- determining whether or not the bundle is registered in an existing DMT;
- determining that a file type is contained by the bundle for at least one file; and
- generating a unique filename for the at least one file of the file type contained in the bundle, associating the unique filename with the at least one file, and copying the at least one file if the bundle is not registered in the existing DMT.

8. The method of claim 7, further comprising generating a log error message if the bundle is registered in the existing DMT.

9. The method of claim 7, wherein the step of determining whether a file type is contained by the bundle further comprises: determining whether metadata files are contained by the bundle, generating unique filenames for the metadata files contained in the bundle, associating the unique filenames with the metadata files and copying the metadata files.

10. The method of claim 7, wherein the step of determining whether a file type is contained by the bundle further comprises: determining whether plug-in files are contained by the bundle, generating unique filenames for the plug-in files contained in the bundle, associating the unique filenames with the plug-in files and copying the plug-in files.

11. The method of claim 7, wherein the step of determining whether a file type is contained by the bundle further comprises: determining whether script files are contained by the bundle, and loading the script files.

12. The method of claim 7, further comprising invoking a native function and reloading metadata.

13. The method of claim 12, further comprising loading a plug-in file.

14. The method of claim 13, further comprising executing a script file.

15. The method of claim 14, wherein the script file is a SyncML script file.

* * * * *